3,123,613
METHOD FOR PRODUCING 2-PYRIDINEAL-DOXIME METHOCHLORIDE

Lillian P. Bloch, Jamaica, N.Y., assignor to Campbell Pharmaceuticals, Inc., New York, N.Y., a corporation of Delaware
No Drawing. Filed May 5, 1961, Ser. No. 107,894
8 Claims. (Cl. 260—296)

The present invention relates to a novel method for the manufacture of 2-pyridinealdoxime methochloride. The novel method is practical, economical and uses readily available raw materials which yield a product of high purity suitable for drug use and especially for the preparation of solutions for intravenous injections.

The compound 2-pyridinealdoxime methochloride occurs as a white crystalline powder which is soluble in water to the extent of one gram in less than one cc. The chemical structure is as follows:

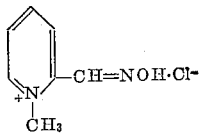

The molecular weight is 173. The compound is currently of interest and under investigation as an antagonist to anticholinesterases and has been found to be of interest in the treatment of insecticide posioning, opthalmology, myasthenia gravis and, potentially, for the management of toxicity due to chemical warfare agents.

Prior methods for the preparation of 2-pyridinealdoxime methochloride are as follows:

(1) 2-pyridinealdoxime methiodide is converted to the chloride by contacting a solution of the iodide with solid silver chloride, filtering off the silver iodide formed and evaporating the aqueous solution to dryness at relatively low temperatures. This process requires an expensive reagent and tends to leave traces of silver in the product, which are difficult to remove.

(2) 2-pyridinealdoxime methiodide may be converted to the chloride by means of an anion exchange resin. This method is cumbersome and is also relatively expensive because of the fact that regeneration of the iodide saturated resin is difficult, and, like the method 1 above, it requires the evaporation of large volumes of water at low temperatures. There are similar objections to conversion of other salts, such as the methylsulfate, to the chloride by this means.

(3) Direct quaternization of 2-pyridinealdoxime with methyl chloride can be carried out if a pressure reactor is used, but poor yields are obtained and the product requires several recrystallizations to reach an acceptable purity.

This invention provides a method of converting the intermediate product 2-pyridinealdoxime metho-methylsulfate to the corresponding methochloride by a simple one-step operation which gives a high yield of pure product.

The method of this invention utilizes the intermediate product 2-pyridinealdoxime metho-methylsulfate which is readily obtained from dimethyl sulfate and 2-pyridinealdoxime. This is converted into the 2-pyridinealdoxime methochloride by contacting it with water, hydrogen chloride and a water-miscible organic solvent.

The salts of 2-formyl-1-methyl pyridinium oxime are known to be specific antidotes for anticholinesterases and are used for treatment of poisoning due to accidental contact with insecticides, such as neostigmine or echothiophate. Of the various salts that have been tested, the chloride appears to be clearly superior, because of solubility, stability, activity per unit weight and physiologic compatibility. Although the solubility in water of the chloride and methyl sulfate salts of 2-formyl-1-methyl-pyridinium oxime is about the same, it was found that 2-pyridinealdoxime metho-methylsulfate is considerably more soluble than 2-pyridinealdoxime methochloride in organic solvents, and strikingly more so in a mixture of water and an organic solvent. As is shown from Table I it is clear, that at room temperature, the methylsulfate is almost ten times as soluble as the chloride in a 10 to 1 mixture of isopropanol and water.

TABLE I

Solubility of 2-Pyridinealdoxime Methochloride and 2-Pyridinealdoxime Metho-Methylsulfate in Various Solvents

| Solvent | Solubility in gm. per 100 cc. of solution | | | |
|---|---|---|---|---|
| | 0° C. | | 25° C. | |
| | Chloride | Methyl-sulfate | Chloride | Methyl-sulfate |
| Acetone | <0.002 | 0.16 | 0 | 0.14 |
| Isopropanol | 0.053 | 0.20 | 0.09 | 0.53 |
| Ethanol | 0.435 | 1.2 | 0.89 | 3.48 |
| Methanol | 4.4 | 16.0 | 8.5 | 48.5 |
| Water | 54.3 | 43.3 | 65.5 | 87.8 |
| Isopropanol, 10 volumes/water, 1 volume | 1.0 | 5.4 | 1.8 | 17.0 |

Thus, if 2-pyridinealdoxime metho-methylsulfate is dissolved in concentrated hydrochloric acid and a water-miscible organic solvent is added, 2-pyridinealdoxime methochloride will precipitate in a high degree of purity and good yield. Minute traces of sulfate are detectable in the product, but are without physiologic significance. The preferred solvent is isopropanol. Isobutanol, acetone, ethanol, methanol, propylene glycol and dioxane have all been found operable. The reaction mixture may be chilled in an ice bath or merely let stand at room temperature for two or three hours before filtering off the product. The lower temperature gives a slightly better yield of product which is slightly less pure.

The process may be carried out by various procedures such as:

(a) The 2-pyridinealdoxime metho-methylsulfate is dissolved completely in concentrated hydrochloric acid and the solvent added with stirring. This causes precipitation of the chloride salt which is filtered off.

(b) The concentrated hydrochloric acid and the solvent are premixed, the 2-pyridinealdoxime metho-methylsulfate is added as a solid and the mixture agitated for about two hours at room temperature, after which the precipitate is filtered off. In this case an actual solution is never seen, but at equilibrium a product is obtained which contains less than 1% of unconverted methylsulfate.

The process has been carried out successfully using from 1 to 5 mols of hydrogen chloride per mol of methylsulfate salt, water in the amount of from 0.35 to 1.6 cc. per gram of starting material, and an organic solvent in the amount of from six to fifteen times the total volume of water in the reaction mixture. Within this range the solvent ratio does not greatly affect the yield or purity of the product. Less than six volumes of solvent tends to reduce the yield. Proportions of about two mols of hydrogen chloride per mol of methylsulfate, 0.66 cc. of water per gram of methylsulfate and 10 volumes of isopropanol per volume of water give very satisfactory results.

The preparation of the intermediate product, 2-pyridinealdoxime metho-methylsulfate, is as follows. One kilogram of 2-pyridinealdoxime is dissolved in six liters of acetone and filtered until clear. Two kilograms (2 equivalents) of freshly distilled dimethyl sulfate are added and the solution mixed. In about 30 minutes crystals start to appear, after which a cooling bath is used to keep the temperature at about 30° to 35° C. until the reaction is nearly complete (about 2 hours). The mixture is allowed to stand at room temperature overnight, the crystals filtered off and washed on a filter with acetone. The product is obtained as colorless needles which melt at 111° to 112.5° C. The methylsulfate is not stable indefinitely. For preparation of pure chloride salt it is desirable to use methylsulfate which gives no titratable acidity with sodium hydroxide using bromphenolblue as indicator.

The following examples are illustrative of the process of the present invention for producing 2-pyridinealdoxime methochloride and are not to be construed as limiting:

EXAMPLE 1

Ten grams of 2-pyridinealdoxime methomethylsulfate is dissolved in 6 cc. of concentrated hydrochloric acid, and 60 cc. of isopropanol is added with stirring. Crystals appear almost instantly. After two hours standing at room temperature, the crystals are separated by filtration and washed with acetone. The product had a melting point of 227–8° C. and the yield was 85%.

EXAMPLE 2

Ten grams of 2-pyridinealdoxime methomethylsulfate is dissolved in 6 cc. of concentrated hydrochloric acid, and 60 cc. of acetone is added with stirring. At first two liquid layers appear, then a slightly gummy precipitate, and finally a coarse granular precipitate is obtained. After two hours standing at room temperature, the crystals are separated by filtration and washed with acetone. The product had a melting point of 217–20° C. and the yield was 74.7%.

EXAMPLE 3

Ten grams of 2-pyridinealdoxime methomethylsulfate is dissolved in 3.5 cc. of concentrated hydrochloric acid, and 35 cc. of methanol is added. Crystals appear slowly; the mixture is chilled for two hours in an ice bath, the crystals separated by filtration and washed with acetone. The product had a melting point of 225–6° C. and the yield was 29.6%.

EXAMPLE 4

The same method is used as described in Example 1, except that absolute ethanol is used in place of isopropanol. The product had a melting point of 226–7° C. and the yield was 69.7%.

EXAMPLE 5

The same method is used as described in Example 1, except that isobutanol is used in place of isopropanol. The crystals obtained are somewhat gummy at first, but soon become granular on mixing. The product had a melting point of 224–5° C. and the yield was 84.3%.

EXAMPLE 6

Ten grams of 2-pyridinealdoxime methomethylsulfate is dissolved in 6 cc. of concentrated hydrochloric acid and 60 cc. of propylene glycol is added. Crystals appear very slowly. The mixture is chilled well in an ice bath and after about 3 hours the very fine precipitate is filtered off and washed with acetone. The product had a melting point of 226–7° C. and the yield was 27.0%.

EXAMPLE 7

Ten grams of 2-pyridinealdoxime methomethylsulfate is dissolved in 6 cc. of concentrated hydrochloric acid, and 60 cc. of dioxane is added. Two liquid layers appear at first, but stirring brings out a crop of crystals, which is filtered off after about 3 hours at room temperature, and washed with acetone. The product had a melting point of 218–9° C. and the yield was 28.8%.

EXAMPLE 8

Isopropanol, 60 cc., is mixed with 6 cc. of concentrated hydrochloric acid. Solid 2-pyridinealdoxime methomethylsulfate, 10 grams, is added and the mixture stirred for two hours at room temperature. The crystals are filtered off and washed with acetone. The product had a melting point of 225–6° C. and the yield was 86.0%.

EXAMPLE 9

The same method is used as described in Example 8, except that acetone is used in place of isopropanol. A slight gumminess is observed on first adding the methylsulfate, but the precipitate quickly becomes granular. The product had a melting point of 225–6° C. and the yield was 74.6%.

EXAMPLE 10

Ten grams of 2-pyridinealdoxime methomethylsulfate is dissolved in 3.5 cc. of concentrated hydrochloric acid and 1.5 cc. of water. Fifty cc. of isopropanol is added. Crystals appear which are filtered off after two hours and washed with acetone. The product had a melting point of 227–8° C. and the yield was 64.3%.

EXAMPLE 11

Ten grams of 2-pyridinealdoxime metho-methylsulfate is dissolved in 8 cc. of concentrated hydrochloric acid and 80 cc. of isopropanol is added. Crystals appear quickly, and are filtered off after two hours at room temperature and washed with acetone. The product had a melting point of 229–30° C. and the yield was 84.2%.

EXAMPLE 12

Ten grams of 2-pyridinealdoxime metho-methylsulfate is dissolved in 16 cc. of concentrated hydrochloric acid, and 160 cc. of isopropanol is added. Crystals appear quickly, and are filtered off after two hours at room temperature and washed with acetone. The product had a melting point of 229–30° C. and the yield was 81.7%.

EXAMPLE 13

The same method is used as described in Example 11, except that the mixture is chilled in an ice bath before filtering off the product. The product had a melting point of 226–7° C. and the yield was 91.4%.

What is claimed is:
1. Method for the preparation of 2-pyridinealdoxime methochloride which comprises reacting 2-pyridinealdoxime metho-methylsulfate with hydrogen chloride in the presence of water and a water-miscible organic solvent.
2. Method for the preparation of 2-pyridinealdoxime methochloride which comprises mixing 2-pyridinealdoxime metho-methylsulfate with hydrochloric acid and adding a water-miscible organic solvent to the mixture.
3. Method for the preparation of 2-pyridinealdoxime methochloride which comprises forming a mixture of hydrochloric acid and a water-miscible organic solvent, and adding to said mixture 2-pyridinealdoxime metho-methylsulfate.

4. The method of claim 1 wherein the water-miscible solvent is a lower alkanol.

5. The method of claim 1 wherein said organic solvent is isopropanol.

6. The method of claim 1 wherein said organic solvent is acetone.

7. The method of claim 1 wherein said organic solvent is propylene glycol.

8. The method of claim 1 wherein said organic solvent is dioxane.

References Cited in the file of this patent

UNITED STATES PATENTS

| | | |
|---|---|---|
| 2,547,782 | Rhodehamel | Apr. 3, 1951 |
| 2,816,113 | Wilson et al. | Dec. 10, 1957 |
| 2,859,217 | Soper | Nov. 4, 1958 |
| 2,922,786 | Sam | Jan. 26, 1960 |

OTHER REFERENCES

MacArdle: "Use of Solvents in Syn. Org. Chem." (Van Nostrand), pp. 3, 40–50 (1925).